(12) United States Patent
Odent et al.

(10) Patent No.: US 7,421,546 B2
(45) Date of Patent: Sep. 2, 2008

(54) INTELLIGENT STATE ENGINE SYSTEM

(75) Inventors: Stephane V. Odent, Enghien (BE);
Dimitri Van de Putte, Brussels (BE);
Dominique Vernier, Brussels (BE)

(73) Assignee: RelayStar SA/NV (BE)

( * ) Notice: Subject to any disclaimer, the term of this patent is extended or adjusted under 35 U.S.C. 154(b) by 457 days.

(21) Appl. No.: 10/779,343

(22) Filed: Feb. 12, 2004

(65) Prior Publication Data
US 2005/0182638 A1   Aug. 18, 2005

(51) Int. Cl.
*G06F 12/00* (2006.01)
(52) U.S. Cl. .............................. 711/156; 705/1; 705/26
(58) Field of Classification Search ................ 705/1, 705/26; 711/156
See application file for complete search history.

(56) References Cited

U.S. PATENT DOCUMENTS

| | | | |
|---|---|---|---|
| 5,790,898 A | | 8/1998 | Kishima et al. |
| 6,041,306 A | | 3/2000 | Du et al. |
| 6,105,087 A | | 8/2000 | Rivoir |
| 6,138,171 A | * | 10/2000 | Walker ........................ 719/318 |
| 6,889,194 B1 | * | 5/2005 | Kadaba ........................... 705/1 |
| 2002/0032612 A1 | * | 3/2002 | Williams et al. ............... 705/26 |
| 2002/0198787 A1 | * | 12/2002 | Yang ............................. 705/26 |
| 2003/0074090 A1 | | 4/2003 | Becka et al. |
| 2003/0187743 A1 | | 10/2003 | Kumaran et al. |
| 2003/0195789 A1 | | 10/2003 | Yen |

FOREIGN PATENT DOCUMENTS

| | | |
|---|---|---|
| WO | WO 01/03037 | 1/2001 |
| WO | WO 01/03037 A2 | 1/2001 |
| WO | WO 02/054322 | 7/2002 |
| WO | WO 02/054322 A2 | 7/2002 |

OTHER PUBLICATIONS http://www.amazon.com/—Amazon.com (various pages as viewed Feb. 22, 2001).
http://www.fedex.com/—FedEx (various pages as viewed Feb. 22, 2001).
http://www.gap.com/—Gap Online (various pages as viewed Feb. 22, 2001).
Mohan et al., A State Machine Based Approach for a Process Driven Development of Web-Applications, XP-002296177, CAISE, 2002.

(Continued)

*Primary Examiner*—Matt Kim
*Assistant Examiner*—Sheng-Jen Tsai

(57) ABSTRACT

A state engine system is disclosed. The system includes: a CPU and a memory operatively connected to the CPU, the memory including a program adapted to be executed by the CPU and the CPU and memory cooperatively adapted for managing a plurality of objects stored in a database, whose behavior can be modeled by means of a state diagram reacting on external events which occur in a non-deterministic order. The system additionally includes code segment embodied on a computer-readable medium configured and adapted for creating, storing and maintaining state diagram templates in a database. The database includes all states available for the object, the possible state transitions, the events which cause state transitions, and the actions which occur upon state transitions. There is at least one event causing each state transition, and the actions which occur upon a state transition are dependent upon the event that caused the transition.

19 Claims, 9 Drawing Sheets

OTHER PUBLICATIONS

Anonymous, "Table Driven Software Architecture", IBM Tech Disclosure Bulletin, vol. 29, No. 10, Mar. 1987.

Murata, et al., "Hierarchical Specification of Reactive System using State Diagram Matrix," IEEE, 1993.

Tomohiro Murata, et al., "Hierarchical Specification of Reactive System Using State Diagram Matrix," IEEE International Conference on Industrial Electronics, Control, and Instrumentation, Nov. 15, 1993, pp. 138-143, XP010109064, New York.

Rakesh Mohan, et al., "A State Machine Based Approach For A Process Driven Development of Web-Applications," IBM Watson Research Center, A. Banks Pidduck et al. (Eds.) CAISE 2002, LNCS 2348, pp. 52-66, 2002.

"Table-Driven Software Architecture," IBM Technical Disclosure Bulletin, vol. 29, No. 10, Mar. 1, 1987, pp. 4280-4281, XP002296178, New York.

EPO Official Communication dated Jul. 20, 2006.

EPO Search Report dated Sep. 14, 2004.

* cited by examiner

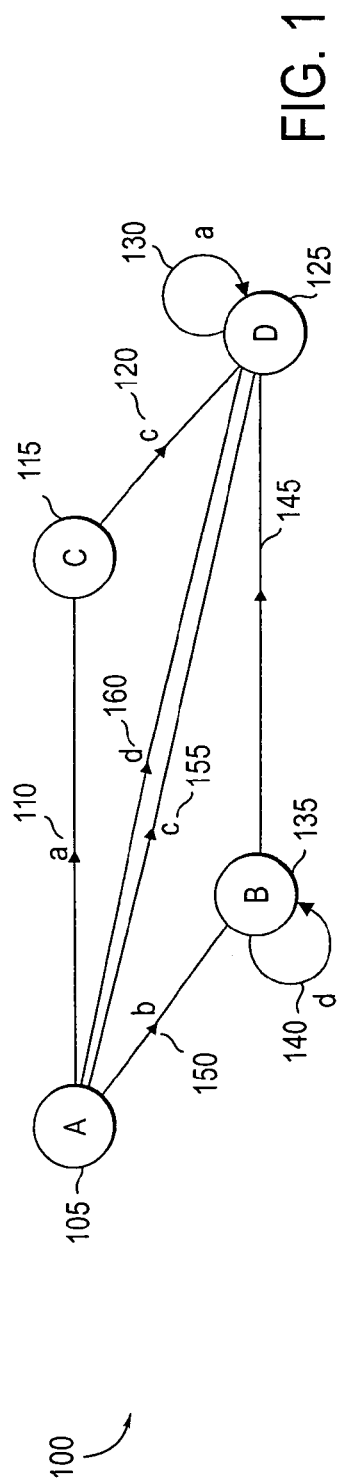

FIG. 10

RELAYSTAR
File  Edit  View  Favorite  Tools  Help

◯ RELAYSTAR — 1005

Extended Tracking  △  | Package Details — 1015

1020 — Tracking Number: 992045D34D4825581 — 1010       Customer Reference: ID07171190 — 1042
1025 — Shipment Type: Delivery                                                CL
1030 — Engineering Name (id): C EVANS (064449) — 1035       Order Number: D84440 — 1044
     1035 — SPLD: Fujitsu                                   Collection Point: Belgrave Street Unit 42 Evans — 1046
1040 — Proof of Delivery Signature available: [Show]                        Business Center
       1050              1055          1060                               ML$ 3NP - Bellhshlll (UK) [6616]
                                                                          Carrier: ANC Logistics — 1048
                                                                                  1070               1075          1080

| Date | Time | Location | Event | Status | Signatures |
|---|---|---|---|---|---|
| 1. 7/07/2003 | 18:51:00-- |  | Complete shipment record received *recorded by warehouse* | Delivery shipped | (NA) |
| 2. 7/07/2003 | 18:56:00-- |  | Complete shipment record received *recorded by warehouse* | -- | (NA) |
| 3. 7/07/2003 | 18:51:40-- |  | Collected from warehouse *recorded by carrier* | Delivery in transit | (NA) |
| 4. 8/07/2003 | 00:00:00-- | Belgrave Street Unit 42 Evans Business Center ML$ 3NP - Bellhshlll (UK) [6616] | Delivered to collection point *recorded by carrier* | Delivery received in collection point | (NA) |
| 5. 8/07/2003 | 04:20:08-- | Belgrave Street Unit 42 Evans Business Center ML$ 3NP - Bellhshlll (UK) [6616] | Delivered to collection point *recorded by carrier* | -- | (NA) |
| 6. 8/07/2003 | 04:15:18-- | Belgrave Street Unit 42 Evans Business Center ML$ 3NP - Bellhshlll (UK) [6616] | Unexpected delivered to end user | -- | (NA) |
| 7. 8/07/2003 | 09:50:10-- | Belgrave Street Unit 42 Evans Business Center ML$ 3NP - Bellhshlll (UK) [6616] | *recorded by collection point* | Delivery delivered to user | (NA) |

Done                                                                                                                 Internet

1000

INTELLIGENT STATE ENGINE SYSTEM

I. COPYRIGHT NOTICE AND AUTHORIZATION

This patent document contains material which is subject to copyright protection.

© Copyright 2004. S.A. TEXACO BELGIUM N.V. All rights reserved.

With respect to this material which is subject to copyright protection. The owner, S.A. TEXACO BELGIUM N.V. has no objection to the facsimile reproduction by any one of the patent disclosure, as it appears in the Patent and Trademark Office patent files or records of any country, but otherwise reserves all rights whatsoever.

II. FIELD OF THE INVENTION

The invention relates to an Intelligent State Engine which comprises a method and system for dynamically managing the behavior of business objects in a computer system that can be modeled with a state diagram in a non-deterministic, asynchronous and distributed event driven network environment.

III. BACKGROUND OF THE INVENTION

A business process is usually described as a sequence of steps and actions, with a clear start and an end. The output of one step provides the input for the next step. Different methods have been developed to model business processes and software tools have been developed to support the information flows related to business processes. While traditionally, enterprise applications were developed to support the actions taken and information processed with a particular step in the process, it is only recently that methods and tools have been developed to support the whole process and the exchange of information between different enterprise applications (example: transfer of information from the ordering system, to the billing system and subsequently to the accounting system). More specifically, workflow systems allow to model graphically the different steps in the process and to connect the output of one step with the input of the next step in the process. These tools usually allow software coding to implement business logic and do data manipulations.

The inconvenience with workflow systems is that the process flow has always to go through a path connecting subsequent steps to reach the end of the process in a deterministic way. Each step in the process is not aware of the whole process; it receives input from its predecessor, does some processing and provides input to its successor. In the real world, processes do not always work that way and workflows are not always the most natural way to represent business interactions between individuals, organizations and systems.

The aim of business processes is to manipulate or transform a business object (like an order, a shipment, a parcel or any business transaction) that is handed over between different individuals, locations, organizations or systems until completion of the transaction. The business objects can be physical (e.g. a parcel) or electronic (e.g. an electronic message). The behavior of such an object can be modeled with a state diagram: during its lifecycle, the object will go through different states. Actions are linked to a particular state of the object. As soon as an object arrives in a certain state, appropriate actions can be taken.

The challenge is to maintain the consistency between the real physical state of the object and the virtual state as maintained by the information system and take the actions linked to valid state transitions in an appropriate way. During the lifecycle of the object, different agents on remote systems will publish events on the current state of the object. Due to the nature of the distributed network like the Internet, the published events do not always arrive to the central information system, there may be delay between the moment that the event was created and the moment it is received in the central system, events may arrive in the wrong order and there may be many occurrences of the same event. In other words, the generation of events is non-deterministic. Existing systems are unable to do so.

A system is needed that provides a generic solution to cope with this complexity.

IV. SUMMARY OF THE INVENTION

The invention includes a state engine system, the system including: a CPU; a memory operatively connected to the CPU, the memory containing a program adapted to be executed by the CPU and the CPU and memory cooperatively adapted for managing a plurality of objects stored in a database, whose behavior can be modeled by means of a state diagram reacting on external events which occur in a non-deterministic order. The program contained in the memory includes a code segment embodied on a computer-readable medium configured and adapted for creating, storing and maintaining state diagram templates in a database, the database including all states available for the object, the possible state transitions, the events which cause state transitions, and the actions which occur upon state transitions: where there is at least one event causing each state transition; and where the actions which occur upon a state transition is dependent upon the event that caused the transition; a code segment embodied on a computer-readable medium configured and adapted for creating a new instance of a state diagram for each new object and maintaining its current state in the running state diagram; a code segment embodied on a computer-readable medium configured and adapted for receiving notification of an event and applying it to the relevant running state diagram; a code segment embodied on a computer-readable medium configured and adapted for causing a state transition upon receiving notification of an event; and a code segment embodied on a computer-readable medium configured and adapted for causing the occurrence of one or more pre-determined actions triggered by a state transition, where one of the pre-determined actions is the initiation of a timer, where the timer is configured to cause an event to occur after a pre-determined time.

Another embodiment of the invention includes a state engine system, the system including: a CPU; a memory operatively connected to the CPU, the memory containing a program adapted to be executed by the CPU and the CPU and memory cooperatively adapted for managing a plurality of objects stored in a database, whose behavior can be modeled by means of a state diagram reacting on external events which occur in a non-deterministic order; a code segment embodied on a computer-readable medium configured and adapted for creating, storing and maintaining state diagram templates in a database, the database including all states available for the object, the possible state transitions, the events which cause state transitions, and the actions which occur upon state transitions: where there is at least one event causing each state transition; and where the actions which occur upon a state transition is dependent upon the event that caused the transition; a code segment embodied on a computer-readable medium configured and adapted for creating a new instance of a state diagram for each new object and maintaining its current state in the running state diagram; a code segment embodied on a computer-readable medium configured and adapted for receiving notification of an event and applying it to the relevant running state diagram; a code segment embodied on a computer-readable medium configured and adapted for causing a state transition upon receiving notification of a event; and a code segment embodied on a computer-readable medium configured and adapted for causing the occurrence of one or more pre-determined actions triggered by a state transition, where one of the pre-determined actions is the initiation of a timer, where the timer is configured to cause an event to occur after a pre-determined time; a code segment embodied on a computer-readable medium configured and adapted for immediately prior to causing the occurrence of the one or more pre-determined actions in step (g), querying whether the state of the object has changed and where the state of the object has changed, canceling one or more of the pre-determined actions.

Another embodiment of the invention includes a method for operating a computer-implemented state engine for managing a plurality of objects stored in a database, whose behavior can be modeled by means of a state diagram reacting on external events which occur in a non-deterministic order, the method including: creating, storing and maintaining state diagram templates in a database, the database including all states available for the object, the possible state transitions, the events which cause state transitions, and the actions which occur upon state transitions: where there is at least one event causing each state transition; and where the actions which occur upon a state transition is dependent upon the event that caused the transition; creating a new instance of a state diagram for each new object and maintaining its current state in the running state diagram; receiving notification of an event and applying it to the relevant running state diagram; causing a state transition upon receiving notification of a event; and causing the occurrence of one or more pre-determined actions triggered by a state transition, where one of the pre-determined actions is the initiation of a timer, where the timer is configured to cause an event to occur after a pre-determined time; and immediately prior to causing the occurrence of the one or more pre-determined actions in step (g), querying whether the state of the object has changed and where the state of the object has changed, canceling one or more of the pre-determined actions.

Another embodiment of the invention includes a machine-readable program storage medium tangibly embodying sequences of instructions, the sequences of instructions for execution by at least one processing system for operating a computer-implemented state engine for managing a plurality of objects stored in a database, whose behavior can be modeled by means of a state diagram reacting on external events which occur in a non-deterministic order, sequences of instructions to perform steps for: creating, storing and maintaining state diagram templates in a database, the database including all states available for the object, the possible state transitions, the events which cause state transitions, and the actions which occur upon state transitions: where there is at least one event causing each state transition; and where the actions which occur upon a state transition is dependent upon the event that caused the transition; creating a new instance of a state diagram for each new object and maintaining its current state in the running state diagram; receiving notification of an event and applying it to the relevant running state diagram; causing a state transition upon receiving notification of a event; and causing the occurrence of one or more pre-determined actions triggered by a state transition, where one of the pre-determined actions is the initiation of a timer, where the timer is configured to cause an event to occur after a pre-determined time; and immediately prior to causing the occurrence of the one or more pre-determined actions in step (g), querying whether the state of the object has changed and where the state of the object has changed, canceling one or more of the pre-determined actions.

These and other features and advantages of the present invention will be made more apparent through a consideration of the following detailed description of a preferred embodiment of the invention. In the course of this description, frequent reference will be made to the attached drawings.

V. BRIEF DESCRIPTION OF THE DRAWINGS

FIG. 1 depicts in one embodiment an exemplary state diagram suitable for use in the system of the invention.

FIG. 2 depicts in one embodiment an exemplary state diagram event-state matrix used in conjunction with the state diagram depicted in FIG. 1.

FIG. 10 depicts in one embodiment a graphical user interface for the system of the invention.

VI. DETAILED DESCRIPTION OF PREFERRED EMBODIMENTS

A. Introduction

Figure 3:
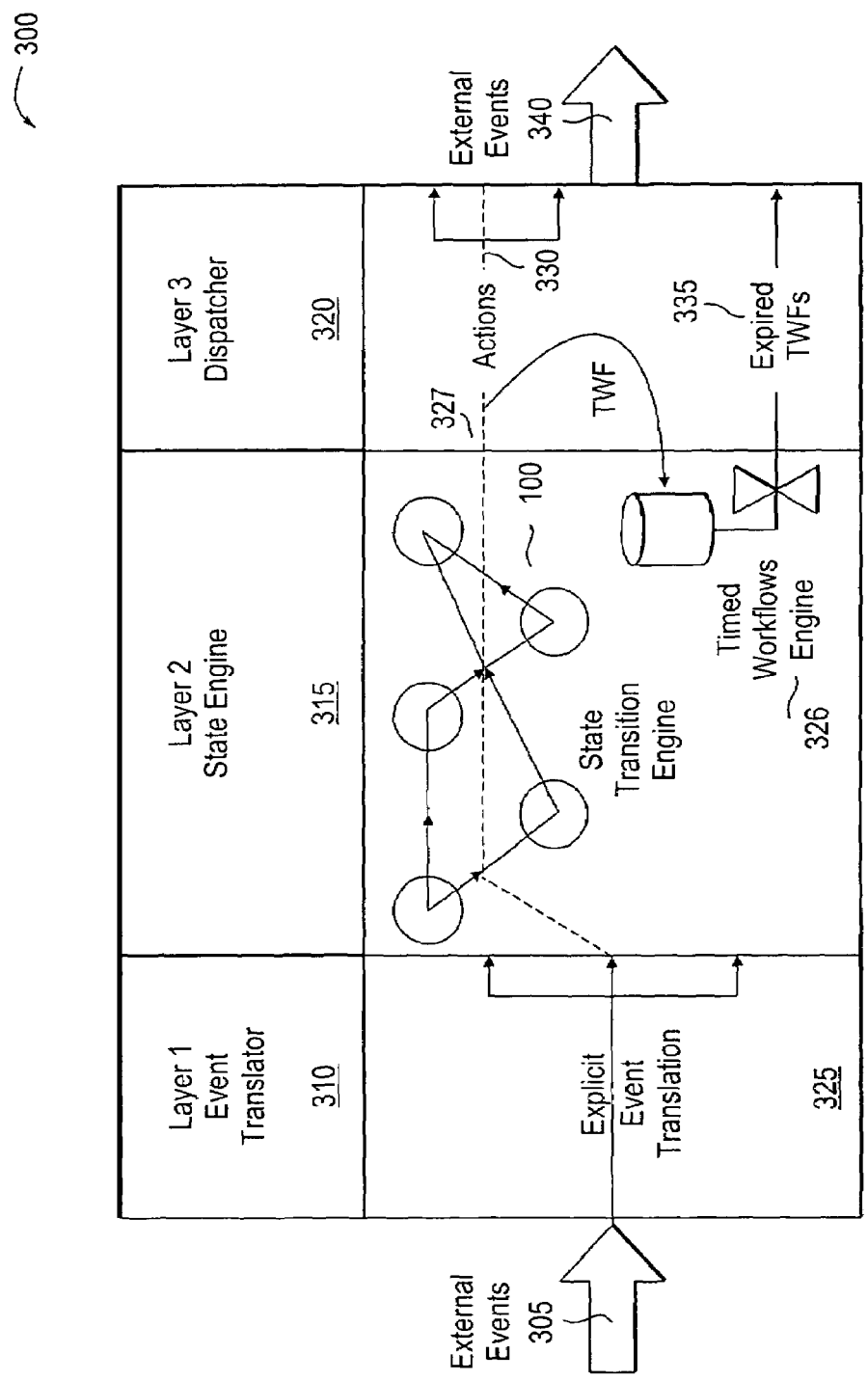
FIG. 3 depicts in one embodiment a schematic system diagram for the 3 layers of the invention.

The following discussion and figures include a general description of a suitable computing environment in which the invention may be implemented. While the invention will be described in the general context of a system and an application program that runs on an operating system in conjunction with general purpose computers, an internet, and web, application, and email servers and clients, those skilled in the art will recognize that the invention also may be implemented in combination with other program modules. Generally, program modules include routines, programs, components, data structures, etc. that performs particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers/servers, workstations, mainframe computers, and the like.

The invention may also be practiced in distributed computing environments where tasks are performed by remote processing devices that are linked through a communications network. In a distributed computing environment, program modules may be located in both local and remote memory storage devices.

Then invention generally relates to a system for an Intelligent State Engine which comprises a method and system for dynamically managing the behavior of business objects in a computer system that can be modeled with a state diagram in a non-deterministic, asynchronous and distributed event driven network environment.

The process aspects of the invention are a series of process steps utilizing, in whole or in part, the system herein and variations thereof. As would be clear to one skilled in the art, the process steps can be embodied in part as code for a computer program for operation on a conventional programmed digital computer, such as a client and server. The program code can be embodied as a computer program on a computer-readable storage medium or as a computer data signal in a carrier wave transmitted over a network.

B. Concept

Then invention is a system and method for an intelligent state engine. An intelligent state engine of the invention, implemented in software, provides a software engine for dynamically responding to events applied on relevant objects whose behavior is modeled with a state diagram. The response to any given event is non-deterministic in that the response depends on the current state of the relevant object or objects. Since the state of a relevant object may change by the time the state engine is notified of an event, this invention accounts for this possibility. Thus, where the state change of an object negates the need for a given action in response to an event or requires a different action, the invention achieves this result. It also gives the possibility to take an action (e.g., a timed workflow or "TWF") when a relevant object has expired a defined delay within a given state. A "timed workflow" in one embodiment, is a delayed action associated with a particular state and a state transition. If an object makes a state transition for which a TWF has been configured, a delayed action will be programmed with a timer. If the timer expires while the object is still in its state, the associated action will be performed. On the other hand, if the object changes state before expiration of the TWF, the action will be cancelled.

The intelligent state engine in one embodiment can be described by a matrix defining the actions to perform when an event occurs depending on the current state of the relevant object: change the current state, take appropriate actions and initiate timed workflows. An example of such a matrix and the related state diagram is represented in FIGS. 1 and 2, discussed below.

Referring now to the drawings, in which like numerals represent like elements throughout the several figures, aspects of the present invention and a suitable operating environment will be described.

FIG. 1 depicts in one embodiment an exemplary state diagram suitable for use in the system of the invention. FIG. 2 depicts in one embodiment an exemplary state diagram event-state matrix used in conjunction with the state diagram depicted in FIG. 1.

A reading of FIG. 2 shows how the state engine of FIG. 1 would behave in case it misses an event. A normal flow of events could be: State A, 105, to State C, 115, with event a, 110, and then to State D, 125, with event c, 120. However, if an object is in State A, 105, but misses event a, 110, then when the state engine receives event c, 120, the object will move to State D, 125.

The state engine can then take the same actions, actions 4 and 5 (see cell 235) as if we would originate from State C (see cell 240) but also takes an additional action 6 (see cell 235). Action 6 could be, for instance, a warning message to notify that it missed event a, 110. If the relevant object later received notification of event a, 130, it will not take the same actions associated with the transition State A, 105, to State C, 115, (see cell 215) as they are not relevant in the context of State D, 125, except for action 1 (see cell 225).

Note also in the example of FIG. 1 that both event c, (155) and event d, (160) will allow a transition from State A, 105, to State D, 125, but the associated actions are different (see cells 235 and 245). Therefore we consider them to be two different transitions of the state diagram.

An example of end use of such application is in a package delivery business. In such a business the state of a package (the relevant object) may change before the state engine receives or can react to an event. E.g., the scanning of a package in a pick-up point (or collection point) generates a "received in collection point" event which typically changes the status of the package from "in transit" to "in collection point" and triggers an action to notify the customer. However, if the reception of the scan event is delayed because of an interruption in the communications network or a synchronization failure and another event "delivered to user" is received in the mean time through another channel so that the state of the package changes to "delivered", then the state engine determines not to send such a notice upon reception of a delayed scan event. Thus, the state engine responded to the same event differently base on the state of the package. The state engine achieves this by rechecking the state of the package object immediately after receiving the "received in collection point" scan event. The event "received in collection point" causing the transition from the state "in transit" to the state "in collection point" could also trigger a timed workflow to notice the customer service in case the package is not collected by the customer within four days and/or send an automatic reminder to the customer.

[The meaning of "immediately" used herein is flexible as will be depend on the type of object and process being modeled by a particular instance of a state diagram where the time is sufficient to avoid taking actions which should be canceled due a state change at least part of the time or may be in "real time". This may be in one exemplary embodiment from about one second to about five minutes prior to causing the action. This methodology can be applied to all or a selected number of actions and state changes, especially those where state changes are likely prior to an action/event which would obviate the need for the action.]

C. Illustrative Implementation

The intelligent state engine of the invention, in one illustrative implementation, has three software components: (1) a message oriented middleware from where it can subscribe to events applicable to relevant objects and where it can publish relevant action messages to which other systems can subscribe; (2) a database to keep the logic of the state diagrams (comprising the relation between events, states and actions), the current state of the relevant active objects and the history of the events; and (3) a program that implements the business logic of the state engine, which comprises 3 layers.

FIG. 3 depicts in one embodiment a schematic system diagram for the 3 layers of the invention. Layer 1, 310, is an event translator; it subscribes to external events/messages, 305, translates and publishes the event/standard messages, 325, which can be interpreted as events to be applied on relevant objects to which Layer 2, 315, will subscribe. Layer 2 is the state engine, 100, in itself; it subscribes to messages, 325, published by Layer 1 and publishes action messages, 327, depending on the state business logic of the relevant objects and the current state. Layer 3, 320, is a dispatcher; it subscribes to action messages, 327, published by Layer 2 and translates them into specific messages, 330, to which other systems can subscribe and can handle execution of the action messages, 340, or pass to other modules/systems for execution.

Some actions may be delayed until a relevant object has stayed a certain time in a particular state. For such actions, Layer 2 can be viewed also as a Timed Work Flow ("TWF") engine, 326, which checks all pending delayed actions at regular intervals and will fire the relevant actions, 335, when the delay has expired. When a relevant object leaves its current state, all associated delayed actions are cancelled.

Figure 4:
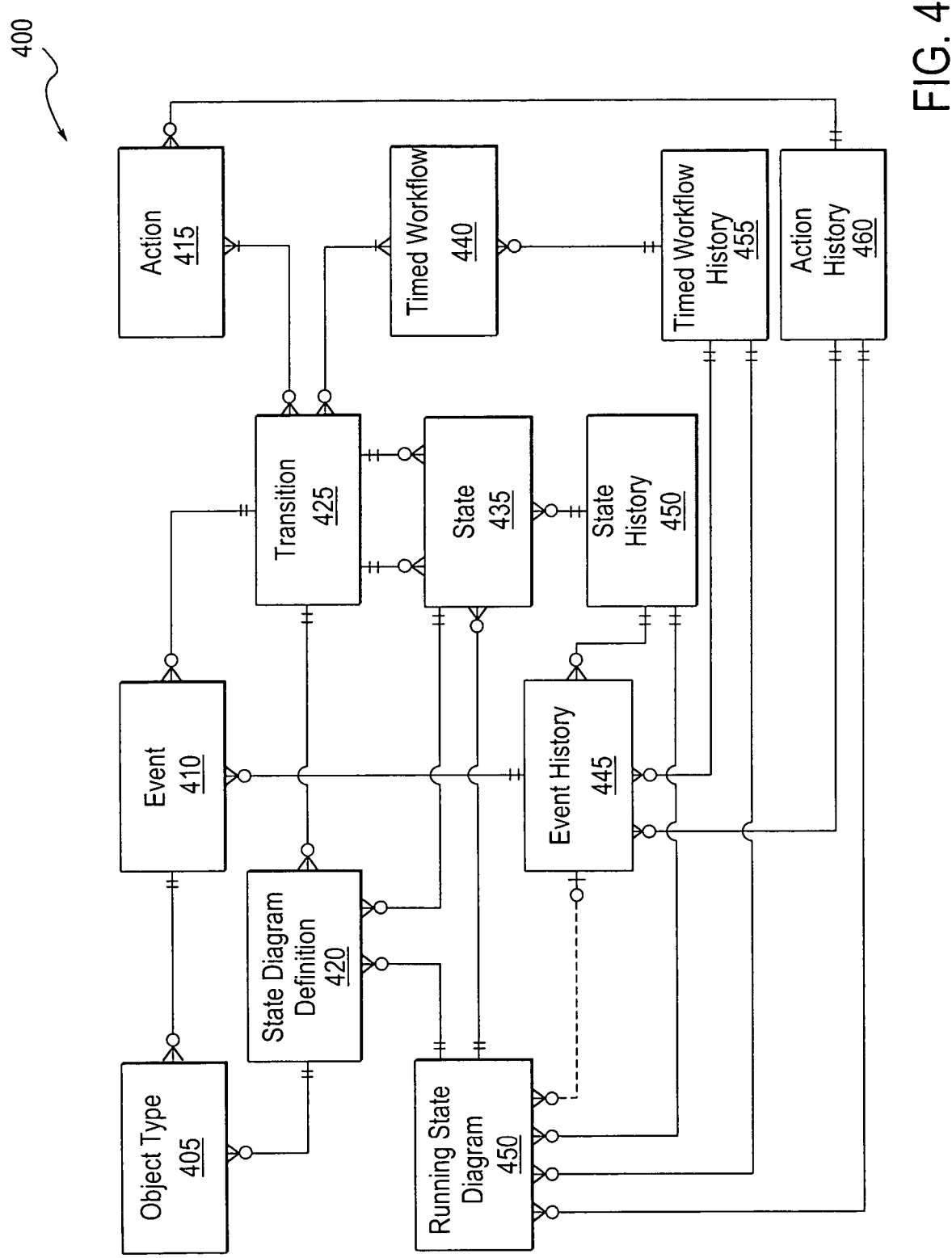
FIG. 4 depicts in one embodiment an exemplary schematic entity-relationship diagram for the system of the invention.

FIG. 4 depicts in one embodiment an exemplary schematic entity-relationship diagram for an underlying database schema to implement the intelligent state engine of the invention. The table below provides further description/definition of the FIG. 4, including a description of the relationship and cardinality between the entities.

| Table name | Description |
| --- | --- |
| Object Type (405) | Definition of the relevant objects whose behavior can be described with a state diagrams and on which events are applied. |
| Event (410) | Definition of the events that are applied on defined relevant objects. An event is applicable to only one type of relevant object, but a relevant object may have many different events. |
| State Diagram Definition (420) | Definition of the state diagrams that model the behavior of the defined relevant objects. A state diagram relates to only one relevant object type, but a relevant object my have several different state diagrams. |
| State (435) | Definition of all possible states contained in a defined state diagram. |
| Transition (425) | Definition of all possible transitions in a defined state diagram. A transition is defined by its state diagram, the current state and an event. Each possible event triggering the transition between two states in a state diagram has a different transition. This offers the possibility to take different actions depending on the type or origin of event. |
| Action (415) | Definition of the actions linked to a transition. Each transition may have different actions and actions can be linked to different transitions. |
| Timed Workflow (440) | Definition of the timed workflow or delayed actions linked to a transition. Each transition may have different timed workflows and timed workflows can be linked to different transitions. |
| Running State Diagram (430) | Instances of running state diagrams modeling the behavior of a real relevant object, with its current state. |
| Event History (445) | History of all events or messages to which the layer 2 is subscribed. |
| State History (450) | History of the new states that were triggered linked to their associated running state diagram and event. |
| Action History (460) | History of the action messages that were published linked to their associated running state diagram and event. |
| Timed Workflow History (455) | History of the timed workflow messages that were published linked to their associated running state diagram and event. |

Figure 5:
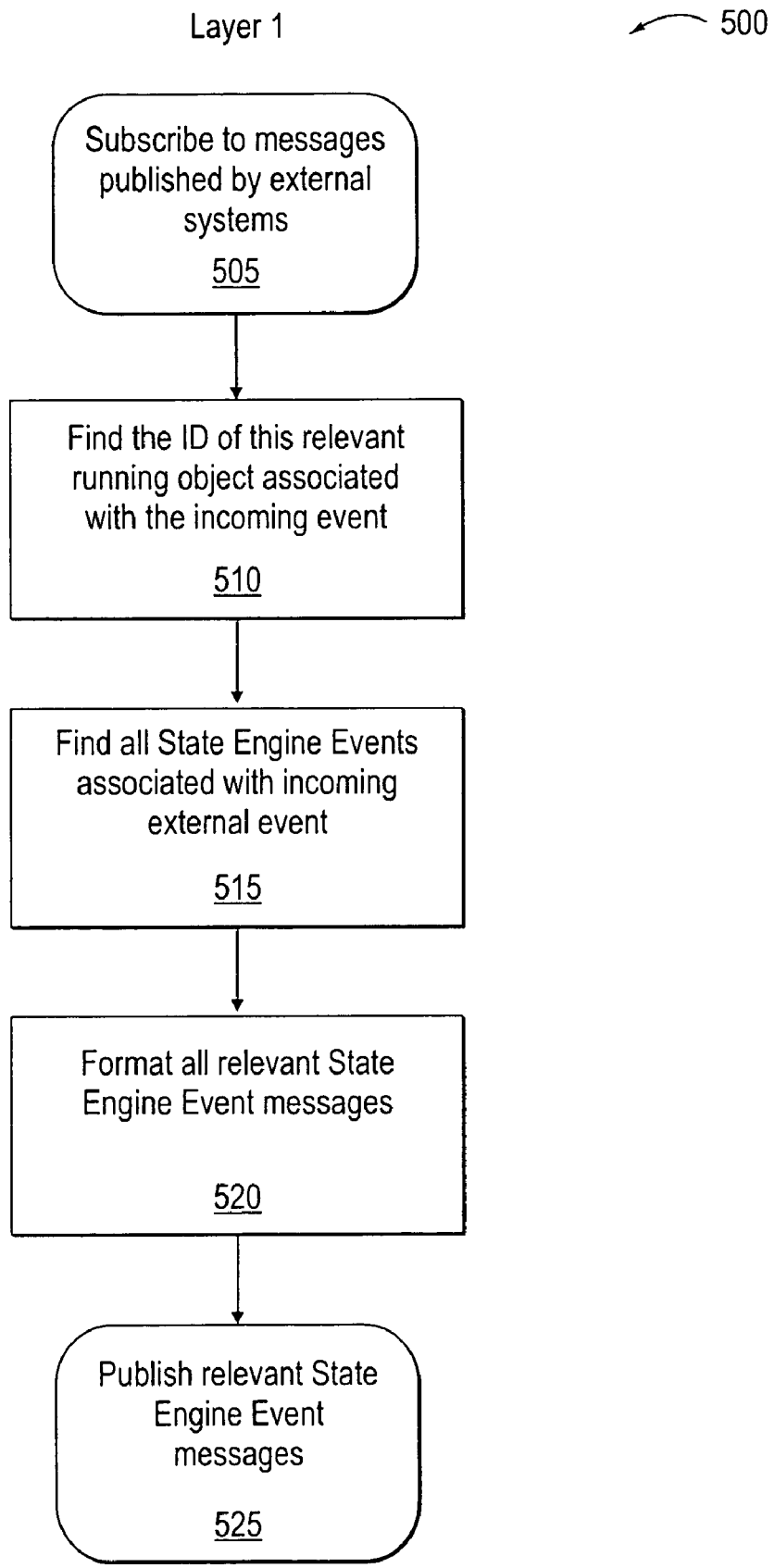
FIG. 5 depicts in one embodiment a schematic process flow diagram for Layer 1 depicted in FIG. 3.
Figure 6:
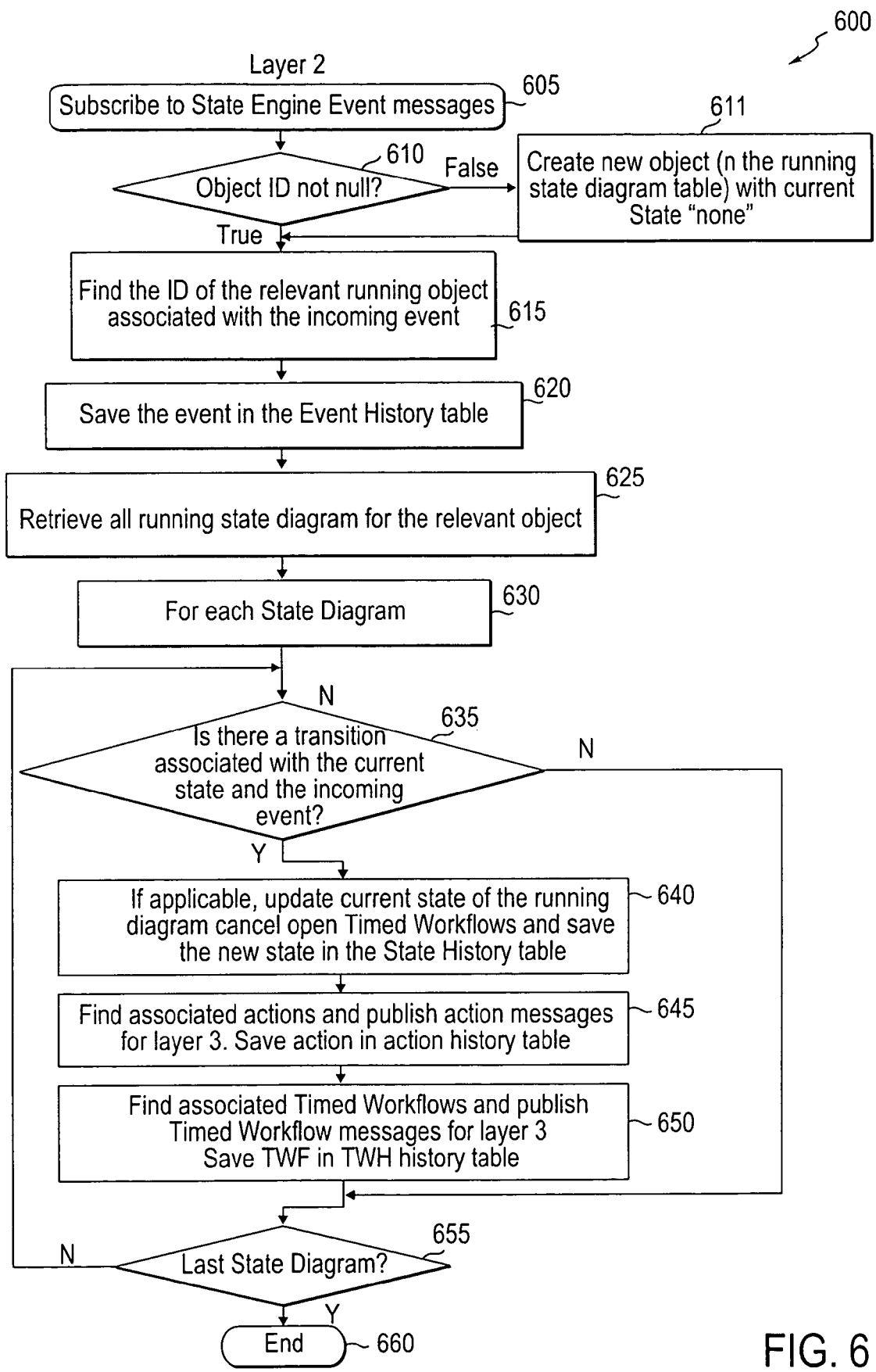
FIG. 6 depicts in one embodiment a schematic process flow diagram for Layer 2 depicted in FIG. 3.
Figure 7:
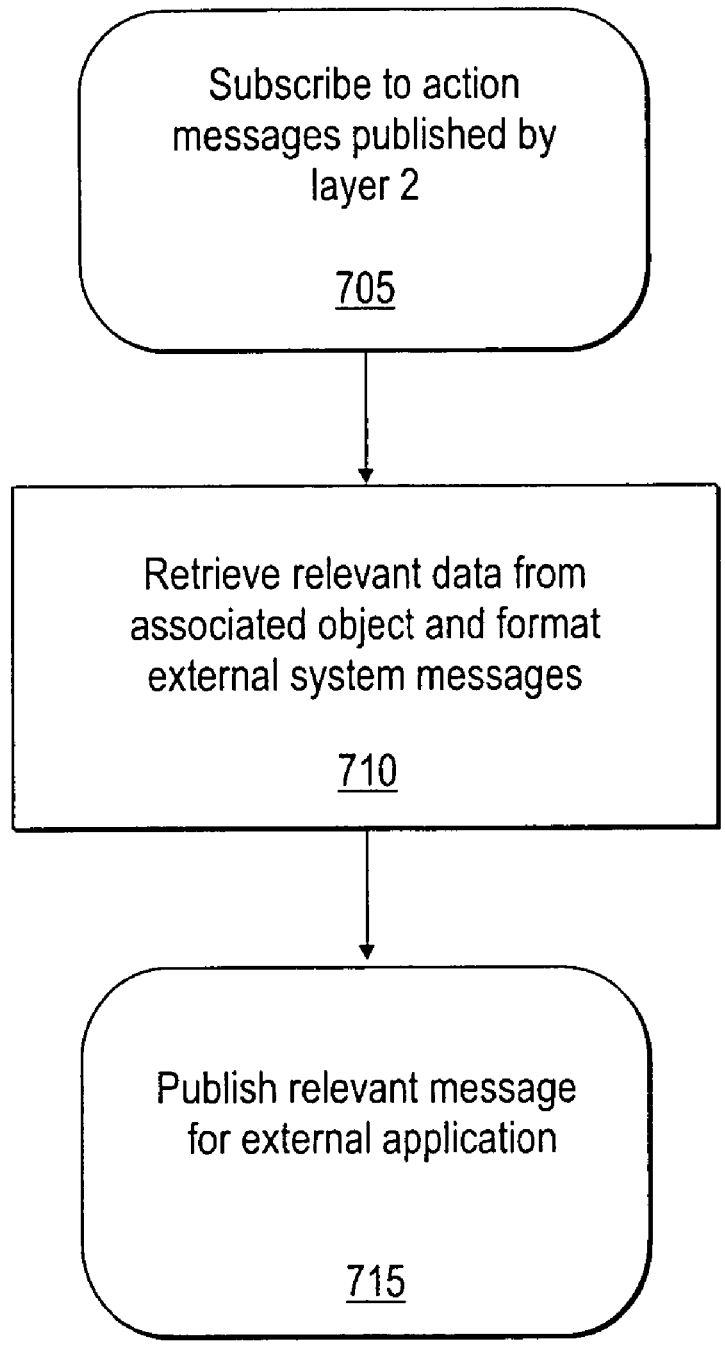
FIG. 7 depicts in one embodiment a schematic process flow diagram for Layer 3 depicted in FIG. 3.

The detailed logic in Layers 1, 2 and 3 is described respectively in FIGS. 5, 6, and 7. FIG. 5 depicts in one embodiment a schematic process flow diagram for Layer 1, depicted generally in FIG. 3. The Layer 1 Event Translator ("Layer 1"), 310, subscribes in step 505 to messages/events published by external systems. Upon receipt of a message, Layer 1 finds the ID of the relevant running object associated with the external event/message in step 510. It then finds all State Engine Events (see FIG. 4, 410) relating to the external event/message (also called "Layer 1Messages" or "State Engine Event Messages" or the like) in step 515. Then Layer 1 formats all relevant State Event Messages in step 520 and publishes them to Layer 2 in step 525.

FIG. 6 depicts in one embodiment a schematic process flow diagram for Layer 2, the State Engine, depicted generally in FIG. 3. Layer 2 subscribes to Layer 1 State Engine Event Messages in step 605. In step 610, upon receipt of a published event from Layer 1, Layer 2 checks that the message's Object ID is not null. If null, a new object is created in the Running State Diagram Table (FIG. 4, 430) and its current state is set to "none" or an equivalent in step 611, and the new objects ID is passed to step 615. If not null in step 610, Layer 2, finds in step 615 the object having the object ID received. In step 620, the Layer 1 event received in step 605 is saved in the Event History Table (FIG. 4, 445). Then Layer 2 retrieves all Running State Diagrams (FIG. 4, 430) for the object in step 625.

A loop of steps 630 is then followed for each state diagram retrieved. In step 635, Layer 2 tests if there is a state transition associated from the Layer 1 message. If none, control is passed to step 655 to test if it is the last State Diagram. If so, the process of Layer 2 ends, 660. If there is a transition in test step 635, then, if applicable, the State Engine of Layer 2 changes the state of the object accordingly, updates the current state of the Running State Diagram, cancels any open TWF's, and saves the new state in the State History Table (FIG. 4, 450).

In step 645, Layer 2 finds associated actions and publishes associated action messages for Layer 3. Actions are saved in the Action History Table (FIG. 4, 460). Any associated TWF's are located and associated TWF's messages (FIG. 3, 335) are published to Layer 3. The TWF information is saved in the TWF History Table (FIG. 4, 655). In step 655, a test is made to determine if this is the Last State Diagram. If not, control returns to the top of loop 630. If not, the process terminates in step 660.

FIG. 7 depicts in one embodiment a schematic process flow diagram for Layer 3, depicted generally in FIG. 3. In step 705, Layer 3 subscribes (i.e., and receives) messages published by Layer 2. Upon receipt of a message, Layer 3 retrieves relevant data of the associated object and formats an associated external system message in step 710. Layer 3 then published the external message (FIG. 3, 340) in step 715.

D. Deployment

Figure 8:
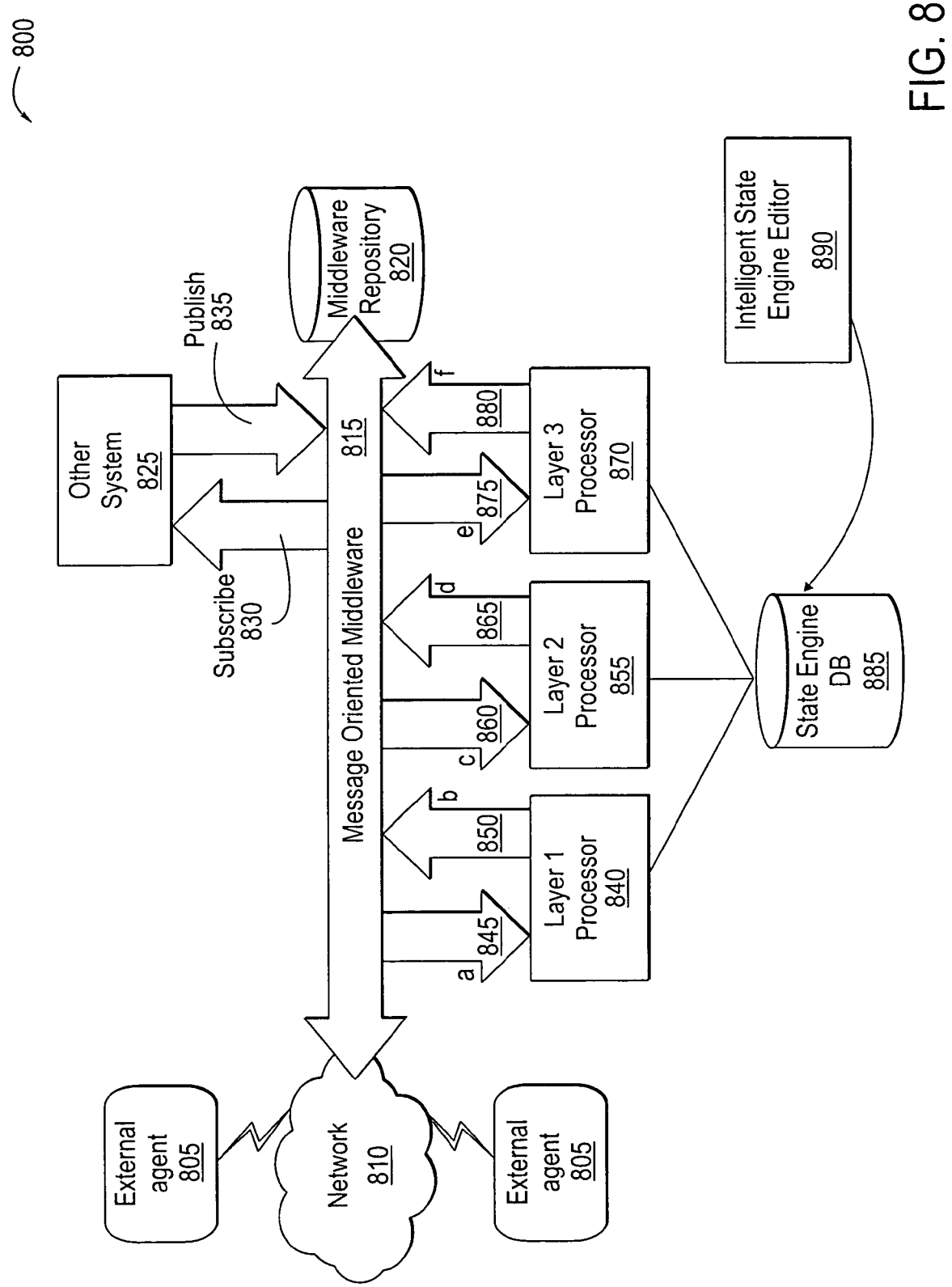
FIG. 8 depicts in one embodiment a schematic system diagram for an exemplary deployment of the system of the invention.

FIG. 8 depicts in one embodiment a schematic system diagram for an exemplary deployment of the Intelligent State Engine of the invention. External events are published by remote external agents 805 (e.g., servers or PDA), which communicate with one or more central servers that can publish messages on a middleware bus 815. This can be through any type of middleware adapter known in the art, e.g., file adapters, application adapters, database adapters, etc. Remote agents 805 communicate with the Intelligent State Engine system by way of any private or public data network 810, e.g., the Internet or VPN, using any now known or future developed data communications protocols, e.g., http, https, FTP, various email protocols, any proprietary protocol between a device capturing events and a central server, etc.

The Layer 1, 2 and 3 are software applications (840, 855, and 870 respectively) which have access to a State Engine Database 885 and can subscribe from (845, 860 and 875 respectively) and publish (850, 865 and 880 respectively) messages on the middleware bus 815. The Intelligent State Engine Editor 890 can be any tool known in the art to manipulate the data records in the State Engine Database, 885.

By way of example, the invention may be implemented to support the business of a package delivery service, i.e., a Pick-Up and Drop-Off ("PUDO") parcel delivery system. State diagrams may be implemented to follow-up packages from the time they are manifested in the warehouse, until they are delivered to end-user and vice-versa for reverse logistics. The state diagram for such a PUDO business could, e.g., feed a tracking system and trigger exceptions when packages stay too long in a collection point.

Figure 9:
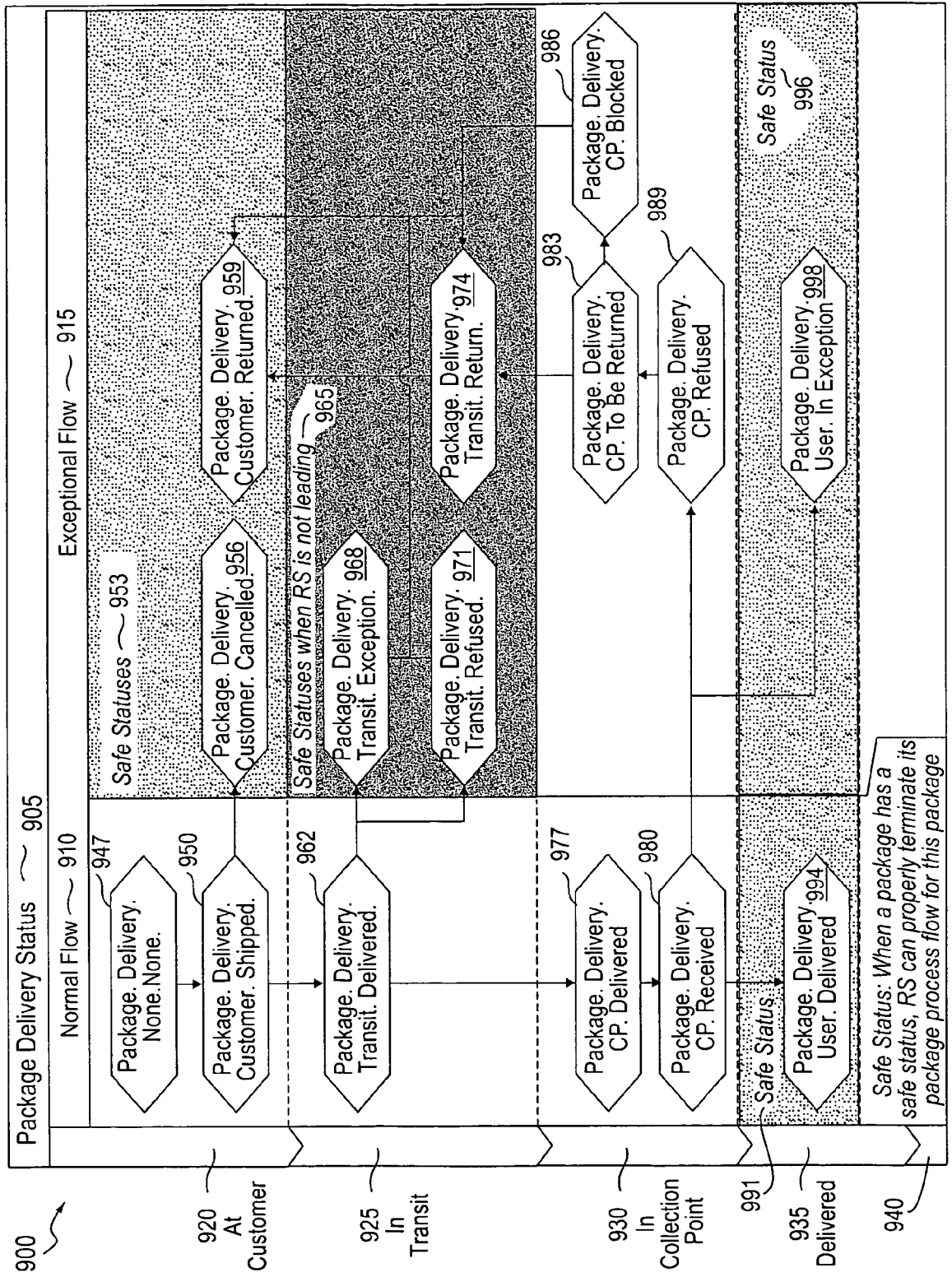
FIG. 9 depicts in one embodiment an exemplary schematic work flow diagram which may be used with the invention.

FIG. 9 depicts in one embodiment an exemplary schematic state diagram which may be used with the invention when implemented for a PUDO parcel delivery process. Events are generated by shipping files created by a shipping application when packages are manifested, hand held scanners scanning the packages in the field, status update files received from courier companies or manual corrections.

In this embodiment of the invention the objects of interest are physical packages for delivery. Thus, the possible object states all relate to the status/location 905 of the package. The notations Normal Flow 910, Exceptional Flow 915, At Customer 920, In Transit 925, In Collection Point 930, Delivered 935 and Safe Statusses 953, 965 and 996 are descriptive elements for the state diagram for this exemplary embodiment and are not intended to limit the invention. The possible states for the package are the hexagonal boxes: None 947, Customer Shipped 950, Transit Delivered 962, CP Delivered 977, CP Received 980, User Delivered 994, Customer Cancelled 956, Customer Returned 959, Transit Exception 968, Transit Refused 971, Transit Return 974, CP To be Returned 983, CP Blocked 986, CP Refused 989, User In Exception.

Different applications used by different actors in the logistical flow will generate events that will trigger the state transitions. The shipping application used in the warehouse will create "shipped" events via a shipping file. A scanner used in the warehouse will scan the packages when they are loaded on the van and generate "lifted" events. A courier company will scan the packages and send status update files containing "in transit" events. The courier company will also send POD ("Proof of Delivery") events to notify that a package has been delivered to destination. A scanner in the Collection Point will scan the packages upon reception by the courier and generate "Received in CP" events and also scan packages when remitted to customer and generate "delivered to customer" events. When remote devices or communication networks fail, a customer service agent could also "simulate" events on a web application to bring the state of a package in its actual state.

FIG. 10 depicts in one embodiment a graphical user interface GUI 1000, implemented as a web site, for one embodiment of the system of the invention. A customer of a PUDO parcel delivery service could access this GUI. It shows how events and status changes are reflected on the tracking web site. A user could access records via entering a Tracking number 1020 or Customer Reference 1042 (text entry fields for each not shown). The entered numbers are passed to an associated tracking database to retrieve the relevant objects and their running state diagrams associated with those numbers. Information displayed in the upper one-half of the GUI window includes information specific to the relevant object: Shipment Type 1025, Engineer Name 1030, Proof of Delivery button 1040, Order Number 1044, Collection Point 1046, and Carrier 1048.

The lower half of GUI window shows the Events 1070 and Statuses 1075 retrieved respectively from the Event History Table (see FIG. 4, ref. 445) and the State History Table (see FIG. 4, ref. 450). Record fields displayed include Event specific detail: Date 1050, Time 1055, Location 1060, Event description 1070, Parcel Status 1075 (in case a state transition was triggered), and availability Signatures 1080. Other fields and subsets of fields are within the scope of the invention.

E. Other Implementation Details

1. Terms

The detailed description contained herein is represented partly in terms of processes and symbolic representations of operations by a conventional computer and/or wired or wireless network. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure.

A "data packet" is type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

2. Hardware

It should be understood that the programs, processes, methods, etc. described herein are not related or limited to any particular computer or apparatus, nor are they related or limited to any particular communication architecture, other than as described. Rather, various types of general purpose machines, sensors, transmitters, receivers, transceivers, and network physical layers may be used with any program modules and any other aspects of the invention constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

3. Program

In the preferred embodiment where any steps of the present invention are embodied in machine-executable instructions, the instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The foregoing system may be conveniently implemented in a program or program module(s) that is based upon the diagrams and descriptions in this specification. No particular programming language has been required for carrying out the various procedures described above because it is considered that the operations, steps, and procedures described above and illustrated in the accompanying drawings are sufficiently disclosed to permit one of ordinary skill in the art to practice the present invention.

Moreover, there are many computers, computer languages, and operating systems which may be used in practicing the present invention and therefore no detailed computer program could be provided which would be applicable to all of these many different systems. Each user of a particular computer will be aware of the language and tools which are most useful for that user's needs and purposes.

The invention thus can be implemented by programmers of ordinary skill in the art without undue experimentation after understanding the description herein.

4. Product

The present invention is composed of hardware and computer program products which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the software portion of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

5. Components

The major components (also interchangeably called aspects, subsystems, modules, functions, services) of the system and method of the invention, and examples of advantages they provide, are described herein with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

6. Web Design

Any web site aspects/implementations of the system include conventional web site development considerations known to experienced web site developers. Such considerations include content, content clearing, presentation of content, architecture, database linking, external web site linking, number of pages, overall size and storage requirements, maintainability, access speed, use of graphics, choice of metatags to facilitate hits, privacy considerations, and disclaimers.

7. Other Implementations

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A state engine system, the system comprising:
   a. a CPU;
   b. a memory operatively connected to the CPU, the memory including a program adapted to be executed by the CPU and the CPU and memory cooperatively adapted for managing a plurality of objects stored in a database, whose behavior can be modeled by means of a state diagram reacting on external events which occur in a non-deterministic order;
   c. a code segment embodied on a computer-readable storage medium configured and adapted for creating, storing and maintaining state diagram templates in a database, the database comprising all states available for an object, the possible state transitions, the events which cause state transitions, and the actions which occur upon state transitions:
      i. wherein there is at least one event causing each state transition; and
      ii. wherein the actions which occur upon a state transition are dependent upon the event that caused the transition;
   d. a code segment embodied on a computer-readable storage medium configured and adapted for creating a new instance of a state diagram for each new object and maintaining its current state in the running state diagram;
   e. a code segment embodied on a computer-readable storage medium configured and adapted for receiving notification of an event and applying it to the relevant running state diagram;
   f. a code segment embodied on a computer-readable storage medium configured and adapted for causing a state transition upon receiving notification of an event;
   g. a code segment embodied on a computer-readable storage medium configured and adapted for causing the occurrence of one or more pre-determined actions triggered by a state transition, wherein one of the pre-determined actions is the initiation of a timer, wherein the timer is configured to cause an action to occur after a pre-determined time; and
   h. a code segment embodied on a computer-readable storage medium configured and adapted for immediately prior to causing the occurrence of the one or more pre-determined actions, querying whether the state of the object has changed and where the state of the object has changed, canceling one or more of the pre-determined actions, wherein querying whether the state of the object has changed occurs from about one second to about five minutes prior to causing the occurrence of the one or more pre-determined actions.

2. The system of claim 1, wherein the states in the state diagram comprise a Parcel-In-Transit state and Parcel-Ready-For-Pick-Up state.

3. The system of claim 1, wherein each new object represents a physical parcel.

4. The system of claim 1, wherein an event causing a state transition comprises delivery of a parcel to a pick-up location.

5. The system of claim 1, wherein a pre-determined action triggered by a state transition comprises notification of customer that parcel is ready for pick up.

6. The system of claim 1, wherein the action occurring after a pre-determined time comprises the raising of a system operator flag.

7. A method of operating a computer-implemented state engine for managing a plurality of objects stored in a database, whose behavior can be modeled by means of a state diagram reacting on external events which occur in a non-deterministic order, the method comprising:
   a. creating, storing and maintaining state diagram templates in a database, the database comprising all states available for an object, the possible state transitions, the events which cause state transitions, and the actions which occur upon state transitions:
      i. wherein there is at least one event causing each state transition; and
      ii. wherein the actions which occur upon a state transition are dependent upon the event that caused the transition;
   b. creating a new instance of a state diagram for each new object and maintaining its current state in the running state diagram;
   c. receiving notification of an event and applying it to the relevant running state diagram;
   d. causing a state transition upon receiving notification of a event;
   e. causing the occurrence of one or more pre-determined actions triggered by a state transition, wherein one of the pre-determined actions is the initiation of a timer, wherein the timer is configured to cause an action to occur after a pre-determined time; and
   f. immediately prior to causing the occurrence of the one or more pre-determined actions, querying whether the state of the object has changed and where the state of the object has changed, canceling one or more of the predetermined actions, wherein querying whether the state of the object has changed occurs from about one second to about five minutes prior to causing the occurrence of the one or more pre-determined actions.

8. The method of claim 7, wherein the states in the state diagram comprise a Parcel-In-Transit state and Parcel-Ready-For-Pick-Up state.

9. The method of claim 7, wherein each new object represents a physical parcel.

10. The method of claim 7, wherein an event causing a state transition comprises delivery of a parcel to a pick-up location.

11. The method of claim 7, wherein a pre-determined action triggered by a state transition comprises notification of customer that parcel is ready for pick up.

12. The method of claim 7, wherein the action occurring after a pre-determined time comprises the raising of a system operator flag.

13. A machine-readable program storage medium tangibly embodying sequences of instructions, the sequences of instructions for execution by at least one processing system for operating a computer-implemented state engine for managing a plurality of objects stored in a database, whose behavior can be modeled by means of a state diagram reacting on external events which occur in a non-deterministic order, the sequences of instructions to perform steps for:
   a. creating, storing and maintaining state diagram templates in a database, the database comprising all states available for an object, the possible state transitions, the events which cause state transitions, and the actions which occur upon state transitions:
      i. wherein there is at least one event causing each state transition; and
      ii. wherein the actions which occur upon a state transition are dependent upon the event that caused the transition;
   b. creating a new instance of a state diagram for each new object and maintaining its current state in the running state diagram;
   c. receiving notification of an event and applying it to the relevant running state diagram;
   d. causing a state transition upon receiving notification of a event;
   e. causing the occurrence of one or more pre-determined actions triggered by a state transition, wherein one of the pre-determined actions is the initiation of a timer, wherein the timer is configured to cause an action to occur after a pre-determined time; and
   f. immediately prior to causing the occurrence of the one or more pre-determined actions in step (e), querying whether the state of the object has changed and where the state of the object has changed, canceling one of more of the predetermined actions, wherein querying whether the state of the object has changed occurs from about one second to about five minutes prior to causing the occurrence of the one or more pre-determined actions.

14. The machine-readable program storage medium of claim 13, wherein the states in the state diagram comprise a Parcel-In-Transit state and Parcel-Ready-For-Pick-Up state.

15. The machine-readable program storage medium of claim 13, wherein each new object represents a physical parcel.

16. The machine-readable program storage medium of claim 13, wherein an event causing a state transition comprises delivery of a parcel to a pick-up location.

17. The machine-readable program storage medium of claim 13, wherein a pre-determined action triggered by a state transition comprises notification of customer that parcel is ready for pick up.

18. The machine-readable program storage medium of claim 13, wherein the action occurring after a pre-determined time comprises the raising of a system operator flag.

19. A machine-readable program storage medium tangibly embodying sequences of instructions, the sequences of instructions for execution by at least one processing system for operating a computer-implemented state engine for managing a plurality of objects whose behavior can be modeled by means of a state diagram, the sequences of instructions comprising:
   a. instructions for storing one or more state diagrams in a database, the database comprising states available for objects, possible state transitions, events which cause state transitions, and actions which occur upon state transitions:
      i. wherein there is at least one event causing each state transition; and ii. wherein actions occur upon state transitions, and at least some actions are dependent upon the event that caused the transition;
b. instructions for receiving notification of an event;
c. instructions for causing a state transition upon receiving notification of the event;
d. instructions for causing the occurrence of one or more pre-determined actions triggered by the state transition, the one or more pre-determined actions including the initiation of a timer, wherein the timer is configured to cause an action to occur after a predetermined time; and
e. instructions for immediately prior to causing the occurrence of the one or more pre-determined actions, querying whether the state of an object has changed and where the state of the object has changed, canceling one or more of the pre-determined actions, wherein querying whether the state of the object has changed occurs from one second to five minutes prior to causing the occurrence of the one or more pre-determined actions.

* * * * *